US009230555B2

(12) United States Patent
Francois et al.

(10) Patent No.: US 9,230,555 B2
(45) Date of Patent: Jan. 5, 2016

(54) APPARATUS AND METHOD FOR GENERATING AN OUTPUT AUDIO DATA SIGNAL

(75) Inventors: Holly Francois, Guildford (GB); Jonathan A. Gibbs, Windermere (GB)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 1113 days.

(21) Appl. No.: 13/260,846

(22) PCT Filed: Apr. 1, 2010

(86) PCT No.: PCT/US2010/029542
§ 371 (c)(1), (2), (4) Date: Jan. 26, 2012

(87) PCT Pub. No.: WO2010/114949
PCT Pub. Date: Oct. 7, 2010

(65) Prior Publication Data
US 2012/0116560 A1 May 10, 2012

(30) Foreign Application Priority Data
Apr. 1, 2009 (EP) .................................... 09157046

(51) Int. Cl.
*G06F 17/00* (2006.01)
*G10L 19/24* (2013.01)

(52) U.S. Cl.
CPC ..................................... *G10L 19/24* (2013.01)

(58) Field of Classification Search
CPC ....................................................... G10L 19/24
USPC ............................................................ 700/94
See application file for complete search history.

(56) References Cited

U.S. PATENT DOCUMENTS 6,393,398 B1 * 5/2002 Imai et al. ..................... 704/254
7,750,829 B2 * 7/2010 Kim et al. ....................... 341/67
(Continued)

FOREIGN PATENT DOCUMENTS

| | | | |
|---|---|---|---|
| EP | 1739917 | A | 1/2007 |
| EP | 722603 | B1 | 3/2008 |
| WO | 2004034379 | A2 | 4/2004 |

OTHER PUBLICATIONS

G.718 specification: Copyright Jun. 2008.*
(Continued)

*Primary Examiner* — Paul McCord
(74) *Attorney, Agent, or Firm* — Birch, Stewart, Kolasch & Birch, LLP

(57) ABSTRACT

An apparatus receives an input encoded audio data signal comprising a base layer and at least one enhancement layer. A reference unit (103) generates reference audio data corresponding to audio data of a reference set of layers. A layer unit (105) divides the layers of the input signal into a first subset and a second subset. A sample unit (107) generates sample audio data corresponding to the audio data of the first subset. A comparison unit (109) generates a difference measure by comparing the sample audio data to the reference audio data based on a perceptual model. An output unit (111) then determines if the difference measure meets a similarity criterion and generates an output signal without audio data from a layer of the second subset if the similarity criterion is met and including the audio data of the layer otherwise. The invention may provide reduced data rates without an unacceptable degradation of quality.

13 Claims, 5 Drawing Sheets

(56) References Cited

U.S. PATENT DOCUMENTS

| | | | | |
|---|---|---|---|---|
| 7,996,233 | B2 * | 8/2011 | Oshikiri | 704/500 |
| 8,326,641 | B2 * | 12/2012 | Song et al. | 704/503 |
| 8,521,314 | B2 * | 8/2013 | Seefeldt et al. | 700/94 |
| 2003/0115042 | A1 * | 6/2003 | Chen et al. | 704/200.1 |
| 2003/0171919 | A1 * | 9/2003 | Kim et al. | 704/229 |
| 2004/0044525 | A1 * | 3/2004 | Vinton et al. | 704/224 |
| 2004/0181394 | A1 * | 9/2004 | Kim et al. | 704/200.1 |
| 2004/0184537 | A1 * | 9/2004 | Geiger et al. | 375/240.11 |
| 2004/0225505 | A1 | 11/2004 | Andersen et al. | |
| 2005/0147159 | A1 | 7/2005 | Kadowaki | |
| 2005/0177364 | A1 | 8/2005 | Jelinek | |
| 2005/0267746 | A1 | 12/2005 | Jelinek et al. | |
| 2006/0002572 | A1 * | 1/2006 | Smithers et al. | 381/104 |
| 2006/0015329 | A1 | 1/2006 | Chu | |
| 2006/0078208 | A1 * | 4/2006 | Malvar | 382/232 |
| 2007/0274383 | A1 * | 11/2007 | Yu et al. | 375/240.11 |
| 2007/0291959 | A1 * | 12/2007 | Seefeldt | 381/104 |
| 2008/0002776 | A1 * | 1/2008 | Borer et al. | 375/240.26 |
| 2008/0059154 | A1 | 3/2008 | Ramo et al. | |
| 2008/0195383 | A1 | 8/2008 | Shlomot et al. | |
| 2008/0284623 | A1 * | 11/2008 | Beack et al. | 341/51 |
| 2009/0094024 | A1 * | 4/2009 | Yamanashi et al. | 704/219 |
| 2010/0017204 | A1 * | 1/2010 | Oshikiri et al. | 704/222 |
| 2010/0067581 | A1 * | 3/2010 | Hong et al. | 375/240.16 |
| 2012/0083910 | A1 * | 4/2012 | Lloyd et al. | 700/94 |

OTHER PUBLICATIONS

Patent Cooperation Treaty, "Notification of Transmittal of the International Search Report and the Written Opinion of the International Searching Authority, or the Declaration", PCT/US10/29542, Jun. 1, 2010, pp. 1-9.

European Patent Office, "Communication Pursuant to Article 94(3) EPC", EPC Appln. No. 09157046.5, Nov. 4, 2010, pp. 1-5, Munich, Germany.

European Patent Office, "Communication", EPC Appln. No. 09157046.5, Jul. 28, 2009, pp. 1-4. Munich, Germany.

* cited by examiner

APPARATUS AND METHOD FOR GENERATING AN OUTPUT AUDIO DATA SIGNAL

FIELD OF THE INVENTION

The invention relates to an apparatus and method for generating an output audio data signal and in particular, but not exclusively, to generation of an encoded audio data signal in a cellular communication system.

BACKGROUND OF THE INVENTION

Digital encoding of audio signals has become increasingly important and is an essential part of many communication and distribution systems. For example, communication of speech and background audio in a cellular communication system is based on encoding of the audio at the source followed by the communication of the encoded audio data to the destination where this is decoded to recreate the source signal.

In general, there is a trade-off between the data rate (or file size) of an encoded signal and the quality that can be provided. In order to adapt the operation of an audio codec to the desired application, coding standards have been developed that provide different quality levels and data rates. In particular, coding standards have been proposed which encode audio in a base layer comprising encoded audio data corresponding to a low quality. Such a base layer may be supplemented by one or more enhancement layers that provide audio data which can be used together with the base layer audio data to generate an audio signal with improved audio quality. For example, when encoding the audio signal to generate the base layer, a residual signal representing the difference between the audio signal and the audio data of the base layer can be generated (typically by decoding the audio data of the base layer and subtracting this from input audio signal). This residual signal may then be further encoded to provide audio data for an enhancement layer. The process can be repeated to provide further enhancement layers.

An example of a layered audio encoding standard is the Embedded variable Bit Rate (EV-VBR) codec standardized as ITU-T Recommendation G.718 by the International Telecommunication Union, Telecommunication Standardization Sector, ITU-T.

G.718 is an embedded scalable speech and audio codec which provides high quality wideband (50 Hz to 7 kHz) speech at a range of bit rates. The codec is particularly suitable for Voice over Internet Protocol (VoIP) and includes functionality making it robust to frame erasures.

The ITU-T Recommendation G.718 codec uses a structure with a discrete layering for mono wideband, stereo wideband, superwideband mono and superwideband stereo layers. Currently the G.718 codec comprises five layers which are referred to as Layer 1 (the core or base layer) through to Layer 5 (the highest enhancement or extension layer) with combined bit rates of 8, 12, 16, 24, and 32 kbit/s. The lower two layers are based on ACELP (Algebraic Code Excited Linear Prediction Technology) with Layer 1 specifically employing a variation of the 3GPP2 VMR-WB (Variable Multi Rate—WideBand) speech coding standard comprising several coding modes optimized for different input signals. The coding error from Layer 1 is encoded in Layer 2, consisting of a modified adaptive codebook and an additional algebraic codebook. The error from Layer 2 is further coded for higher layers in the transform domain using the Modified Discrete Cosine Transform (MDCT). In order to improve the frame erasure concealment, as well as convergence and recovery after erased frames, a few supplementary concealment/recovery parameters are also determined and transmitted in Layer 3.

Layered audio coding provides increased flexibility and allows codecs to be modified to generate additional data for enhancement layers while still providing compatibility with legacy equipment. Furthermore, the layers facilitate the adaptation of the audio data to the specific conditions experienced. For example, when distributing audio data in a communication system, a network element may strip one or more enhancement layers in order to suit a data link with insufficient capacity to carry the whole audio data stream. For example, in a cellular communication system, the audio data may be transmitted over the air interface to a User Equipment (UE). During low load intervals, all data layers may be transmitted to the UE. However, during peak loading only a reduced communication resource may be available for the communication and accordingly the base station may strip one or more layers in order to enable communication using a reduced resource allocation. As a specific example, during low loading, a 32 kbit/s downlink channel may be allocated to the audio communication whereas only 16 kbit/s may be allocated at high loading. In the former case, all layers may be communicated and in the latter case only Layers 1, 2 and 3 will be communicated.

However, although such an approach may work well in many scenarios, it also has associated disadvantages. Specifically, it tends to result in an inflexible and suboptimal resource usage and/or a reduced perceived audio quality. Indeed, when the air interface resource availability is restricted, the perceived quality is continuously degraded.

Hence, an improved approach would be advantageous and in particular an approach allowing increased flexibility, reduced resource consumption, increased audio quality, facilitated implementation and/or improved performance would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention there is provided an apparatus for generating an output audio data signal, the apparatus comprising: means for receiving an input encoded audio data signal comprising a plurality of encoding layers including a base layer and a plurality of enhancement layers; reference means for generating reference audio data from a reference set of layers of the plurality of encoding layers; sample means for generating sample audio data from a set of layers smaller than the reference set of layers; difference means for comparing the sample audio data to the reference audio data, the comparison reflecting a difference between a first decoded signal corresponding to the sample audio data and a second decoded signal corresponding to the reference audio data; output means for determining whether the comparison meets a criterion and if so, generating the output audio data signal to not include audio data from a first layer, the first layer being a layer of the reference set not included in the smaller set of layers, and otherwise, generating the output audio data signal to include audio data from the first layer.

The invention may allow an improved adaptation of an encoded audio signal (such as an audio stream or audio file). In many embodiments, a reduced data rate may be achieved with reduced impact on the perceived audio quality. In many scenarios, the perceived quality reduction may be negligible. The encoded audio stream may for example be adjusted to reflect current conditions in a communication or distribution system while also reflecting the impact perceived by the listeners.

The adaptation of the audio stream need not rely on the original signal, and can be performed by any device or entity receiving the multi-layer audio data signal without reliance on any other information. This may be particularly advantageous in communication systems, where the resource usage may be dynamically modified to reflect current resource conditions while maintaining a high perceived audio quality.

The comparison may reflect the difference between the signals that would result from decoding respectively the smaller set of layers and the reference set of layers but need not include or require actual decoding of the audio data or the generation of the first or second decoded signals. For example, the audio data of the smaller set and the reference set of layers may directly be evaluated using a suitable audio quality assessment model, and specifically a perceptual model.

According to another aspect of the invention there is provided a communication system including a network entity which comprises: means for receiving an input encoded audio data signal comprising a plurality of encoding layers including a base layer and a plurality of enhancement layers; reference means for generating reference audio data from a reference set of layers of the plurality of encoding layers; sample means for generating sample audio data from a set of layers smaller than the reference set of layers; difference means for comparing the sample audio data to the reference audio data, the comparison reflecting a difference between a first decoded signal corresponding to the sample audio data and a second decoded signal corresponding to the reference audio data; output means for determining whether the comparison meets a criterion and if so, generating the output audio data signal to not include audio data from a first layer, the first layer being a layer of the reference set not included in the smaller set of layers, and otherwise, generating the output audio data signal to include audio data from the first layer.

According to another aspect of the invention there is provided a method for generating an output audio data signal, the method comprising: receiving an input encoded audio data signal comprising a plurality of encoding layers including a base layer and a plurality of enhancement layers; generating reference audio data from a reference set of layers of the plurality of encoding layers; generating sample audio data from a set of layers smaller than the reference set of layers; comparing the sample audio data to the reference audio data, the comparison reflecting a difference between a first decoded signal corresponding to the sample audio data and a second decoded signal corresponding to the reference audio data; determining whether the comparison meets a criterion and if so, generating the output audio data signal to not include audio data from a first layer, the first layer being a layer of the reference set not included in the smaller set of layers, and otherwise, generating the output audio data signal to include audio data from the first layer.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to an ITU-T G.718 encoded signal being processed in a network element of a cellular communication system. However, it will be appreciated that the invention is not limited to this application but may be applied to many other systems and codecs.

Figure 1:
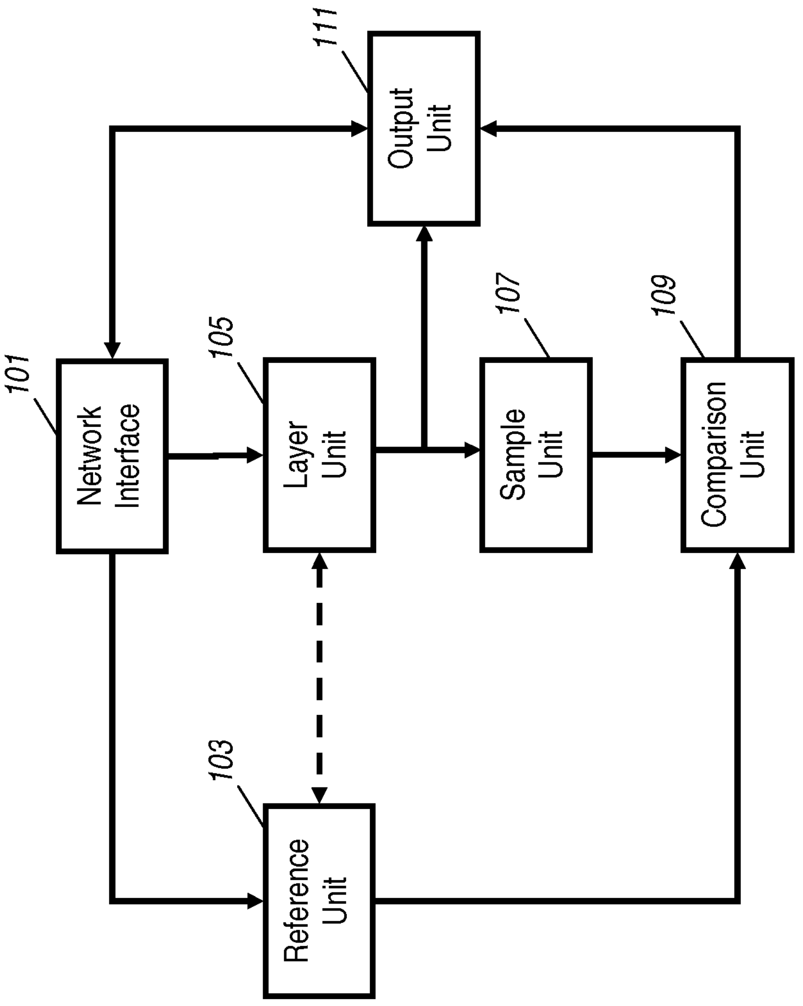
FIG. 1 illustrates an example of an apparatus for generating an output audio data signal.

FIG. 1 illustrates an example of an apparatus for generating an output audio data signal in accordance with some embodiments of the invention. The apparatus may for example be comprised in a network element of an audio distribution system or a communication system.

The apparatus comprises a network interface 101 which is arranged to connect the apparatus to an external data network. The network interface 101 receives and transmits data including encoded audio data.

The network interface 101 may specifically receive an encoded audio signal comprising audio data characterizing a time domain audio signal (henceforth referred to as the source signal). The received encoded audio signal is specifically an input encoded audio data stream comprising audio data for an audio signal. The encoded audio data signal may be provided as a continuous data stream, as a single file, in multiple data packets or in any other suitable way.

The received audio data signal is a layered signal which comprises a plurality of layers including a base layer and one or more enhancement layers. The base layer comprises sufficient data to provide a decoded audio signal. The enhancement layers comprise data providing additional information/data which can be combined with the audio data of the base layer to provide a decoded signal with improved audio quality. For example, each enhancement layer may provide encoding data for a residual signal from the previous layer.

In the specific example, the received encoded audio signal is an ITU-T G.718 encoded audio signal. The received signal can specifically be a full 32 kbit/s signal comprising all five enhancement layers. Accordingly, the received signal includes two lower layers (Layer 1 and 2, referred to as the core layers) which provide parametric encoded data based on a speech coding algorithm that uses a speech model (a Code Excitation Linear Prediction (CELP) algorithm). In addition, three upper layers (Layers 3-5) are provided which provide waveform encoding data for the residual signal of the next lower layer. The encoding algorithm for the higher layers are specifically based on an MDCT frequency conversion of the residual signal followed by a quantization of the frequency coefficients.

The apparatus of FIG. 1 is arranged to perform a dynamic adaptation of the bit rate for the encoded audio signal. Thus, it is arranged to generate an output encoded audio signal (such as an output encoded audio data stream or file) which has a data rate that can be dynamically adapted. The adaptation of the data rate is simply performed by dynamically adjusting which layers are included in the output encoded audio signal. Thus, in the specific example where all layers provide an encoding relative to the next lower layers (i.e. where there are no alternative enhancement layers), the apparatus simply determines how many layers are to be included in the output encoded audio signal. In the example of ITU-T Recommendation G.718 encoding, the apparatus can dynamically select the data rate of the output encoded audio signal to be any value of 8, 12, 16, 24, and 32 kbit/s simply be selecting how many layers of the input encoded audio signal to include in the output encoded audio signal.

The apparatus of FIG. 1 is arranged to dynamically adapt the data rate of the output encoded audio signal based on an analysis of the input encoded audio signal itself. The adaptation may further consider external characteristics but does not need to do so. Specifically, the adaptation of the data rate may take into account conditions and characteristics of the communication medium used. For example, the available bandwidth or loading of a data network which is used for communicating the output signal may be considered when selecting the appropriate data rate. However, the apparatus may also base the data rate on an evaluation of the input encoded audio signal and may indeed in some scenarios adapt the data rate based only on such an evaluation and without considering the characteristics of the communication network.

The apparatus is arranged to classify the input encoded audio signal into different types of audio based on an analysis of the signal itself. Depending on the category that the input encoded audio signal belongs to, it is selected how many layers are included in the output encoded audio signal. The classification is performed by an evaluation of the perceptual improvement that is obtained by applying the higher coding layers.

The apparatus evaluates the perceptual difference for signals corresponding to different numbers of coding layers and uses this to select how many layers to include. Thus, when a given enhancement layer is found to make a significant perceptual contribution, it is maintained in the output encoded audio signal, while the same layer is discarded during periods when it makes only a small perceptual contribution. Specifically, a perceptual measure for a reference signal using all the received layers is compared to a perceptual measure for a signal that uses fewer layers. If the difference between the reference and the test signals is small, this indicates that the higher layers are not contributing in a perceptually significant way and they are therefore discarded to reduce the bit-rate. Conversely, if the difference is large, this indicates that the higher layers are significantly improving the audio quality and they are therefore maintained in the output signal.

Thus, the apparatus dynamically adapts the data rate of the output encoded audio signal depending on an analysis of the input encoded audio signal itself. The apparatus may specifically dynamically reduce the average data rate while only resulting in reduced and often unnoticeable quality degradation. The dynamic data rate adaptation is furthermore based on the encoded signal itself and does not need access to the original source signal. Thus, in contrast to source encoding adaptations of the data rate based on characteristics of the source signal, the current approach can be implemented anywhere in the distribution/communication system thereby allowing a flexible, low complexity yet distributed and localized adaptation of the data rate of an encoded audio signal.

Also, the data rate adaptation may in some embodiments be completely independent of any other measure or characteristic than those derived from the input encoded audio signal itself. For example, an average data rate reduction can be achieved simply by the apparatus processing the input encoded audio signal. Furthermore, the approach is easily combined with adaptations to other characteristics. For example, the consideration of characteristics of the communication network can easily be combined with the current approach, for example by considering such characteristics as part of the decision criterion deciding whether to discard any layers. As a simple example, a load characteristic for the communication network can be provided to the apparatus and used to modify the threshold for when a layer is discarded. For example, when the load is very low the threshold for discarding is set very low such that the layer is almost always maintained. However, for a high load, the threshold may be increased resulting in the layer being discarded unless it is found to be very significant for the perceived audio quality.

In more detail, a reference unit 103 is coupled to the network interface 101 and is arranged to generate reference audio data which corresponds to audio data of a reference set of layers of the input encoded audio signal. The reference audio data provides a representation of the original source signal. Specifically, the reference audio data may be a time domain or frequency domain representation of the source signal. In some embodiments, the reference audio data may be generated by fully decoding the audio data of the reference layers thereby generating a time domain signal. In other embodiments, an intermediate representation of the source signal may be used, such as a frequency representation (which specifically may be a representation that is internal to the coding algorithm or standard used).

In the example, the reference set of layers include all the received layers. Thus, the reference audio data represents the highest quality attainable from the input encoded audio signal. However, it will be appreciated that in other embodiments or scenarios, the reference set of layers may be a subset of the total number of layers of the input encoded audio signal.

The network interface 101 is further coupled to a layer unit 105 which is arranged to select a smaller set of layers from the total number of layers of the input encoded audio signal. Thus, the layer unit 105 effectively divides layers of the input encoded audio signal into a first subset and a second subset where the first subset corresponds to the smaller set of layers and the second subset corresponds to the layers that are not included in the first subset. The first subset includes the base layer and none, one or more enhancement layers. The first and second subsets are disjoint and the second subset includes at least one enhancement layer. Thus, the first subset comprises audio data that provides a reduced quality and data rate representation of the source signal compared to the received signal (and the reference audio data).

In the specific embodiment, the reference set comprises all the layers of the input encoded audio signal and is thus equal to the combination of the first and second subsets. However, in other embodiments, the reference set may not include all the available layers but will include at least one of the layers of the second subset. In many embodiments, the first subset may also be a subset of the reference set.

The layer unit 105 is coupled to a sample unit 107 which receives the audio data of the layers of the first subset. It then proceeds to generate sample audio data corresponding to the audio data of layers of the first subset.

The sample audio data provides a representation of the original (unencoded) source signal based only on the audio data of the layers of the first subset. The sample audio data may be a time domain or frequency domain representation of the source signal. In some embodiments, the sample audio data may be generated by fully decoding the audio data of the sample layers to generate a time domain signal. In other embodiments, an intermediate representation of the source signal may be used, such as a frequency representation (which specifically may be a representation that is internal to the coding algorithm or standard used).

Since the sample audio data represents the source signal by only a subset of the layers, it will typically be of a lower quality than the reference audio data.

The reference unit 103 and the sample unit 107 are coupled to a comparison unit 109 which is arranged to generate a difference measure by comparing the sample audio data to the reference audio data based on a perceptual model. The difference measure may be any measure of a perceptual difference (as estimated by the perceptual model) between the reference audio data and the sample audio data.

The comparison unit 109 determines the perceptual difference between the signals represented by the sample and the reference audio data. Thus, the difference measure is indicative of the perceptual significance of discarding the layer(s) that is(are) included in the reference set but not in the first subset. Thus, the analysis may provide an indication of the perceived quality degradation that arises from discarding these layers. Furthermore, the analysis is based on the encoded signal itself and does not rely on access to the original source signal. Accordingly, it can be performed by any network element receiving the encoded signal.

The comparison unit 109 is coupled to an output unit 111 which proceeds to generate an output encoded audio signal. The output encoded audio signal comprises layers of the input encoded audio signal and does not require any further decoding, encoding or transcoding. Rather, a simple selection of which layers of the input encoded audio signal that are to be included in the output encoded audio signal is performed by the output unit 111.

The output unit 111 initially determines whether the difference measure received from the comparison processor 109 meets a given similarity criterion. It will be appreciated that any suitable criterion may be used and that the specific criterion may depend on the characteristics of the analysis, the difference measure and the requirements and preferences of the individual embodiment. For example, if the difference measure is a simple numerical value, the output unit 111 may simply compare this to a threshold.

The output unit 111 then proceeds to generate the output encoded audio signal to either include audio data for one of the layers of the second subset (the discarded layers when generating the sample audio data) or not dependent on whether the similarity meets the criterion.

Specifically, if the similarity criterion is met, this is indicative of the perceptual significance of the audio data of the second subset being below that represented by the similarity criterion. Accordingly, the layers of the second subset can be discarded without resulting in an unacceptable perceived audio degradation. Accordingly, the output unit 111 proceeds to discard one or more layers of the second subset when generating the output encoded audio signal.

Conversely, if the similarity criterion is not met, this is indicative of the perceptual significance of the audio data of the second subset having being above that represented by the similarity criterion. Accordingly, the layers of the second subset cannot be discarded without resulting in a significant impact on the perception of the listener. Accordingly, the output unit 111 proceeds to include all layers of the second subset when generating the output encoded audio signal (or at least to include one of the layers that would otherwise be discarded).

As a specific example, if the similarity criterion is met, the output unit 111 discards all layers of the second subset and generates an output encoded audio signal comprising only the layers of the first subset. If the similarity criterion is not met, the output unit 111 generates an output encoded audio signal which includes all the layers of the input encoded audio signal, i.e. the layers of both the first and second subset (corresponding to the reference set of layers).

The output unit 111 is coupled to the network interface 101 and feeds the output encoded audio signal to this. The network interface 101 may then transmit the output encoded audio signal to the desired destination.

Thus, the apparatus of FIG. 1 can provide an automated and dynamic data rate adaptation of an encoded multi-layered signal without requiring access to the original source signal. Furthermore, the data rate is dynamically adapted to reflect the characteristics of the signal such that the additional data rate required for enhancement layers is only expended when these are likely to be perceptually significant. Thus, a substantial reduction of the average data rate may be achieved without resulting in a significant perceived audio quality reduction.

For example, for an ITU-T Recommendation G.718 coder, the perceived quality of both speech and music improve as the data rate is increased beyond the 8 kbit/s of the base layer by the introduction of additional enhancement layers. However, due to the excellent performance at 8 kbit/s, the benefits of the higher bit rates in speech in a non-noise environment does not provide a substantially increased perceived audio quality. However, in the presence of background noise, a more substantial improvement is achieved by the additional layers. Furthermore, for music content, a substantial improvement is achieved with a data rate of around 24 kbit/s. This is achieved since the speech model based encoding of the first two layers is not very efficient in encoding music whereas the waveform coding approach of layers 3-5 are much more efficient (although the improvement is typically not substantial for 16 kbit/s as this tends to not provide sufficient available bits for the waveform encoding).

The described approach can enhance the usability of embedded codecs by allowing rate switching based on the characteristics of the coded signal itself. In this way, the perceptual quality of the decoded speech can be substantially maintained while providing a reduced bit rate. For example, the rate can be switched automatically so that speech is transmitted at 12 kbs and music at 32 kbs.

Figure 2:
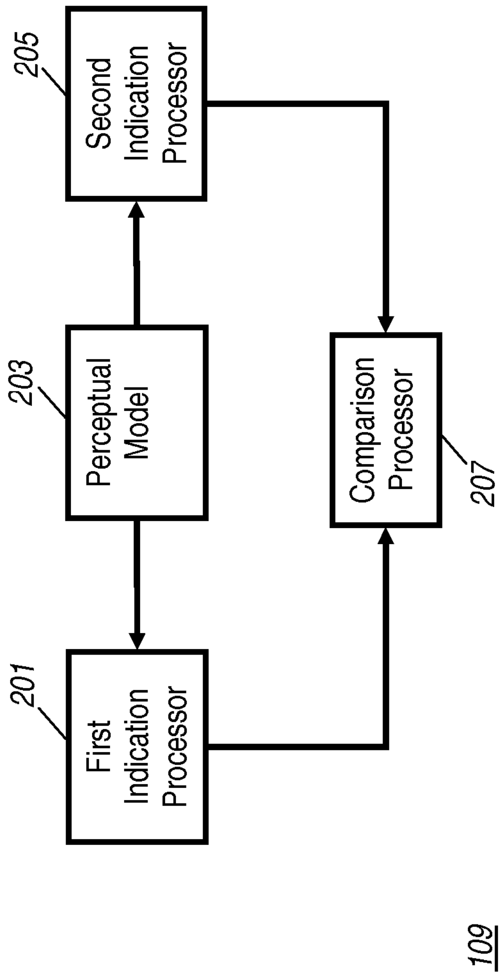
FIG. 2 illustrates an example of elements of an apparatus for generating an output audio data signal.

FIG. 2 illustrates an example of the comparison unit 109 in more detail. In the example, a first indication processor 201 generates a first perceptual indication by applying a perceptual model 203 to the reference audio data. A second indication processor 205 then applies the same perceptual model 203 to the sample audio data to generate a second perceptual indication. The two perceptual indications are fed to a comparison processor 207 which proceeds to calculate the difference measure as a function of the first and second perceptual indications.

In the example, the reference and sample audio data provide a frequency representation of the source signal. Thus, the reference audio data is a frequency domain representation of the time domain signal that would result from decoding the audio data of the reference layers and the sample audio data is a frequency domain representation of the time domain signal that would result from decoding the audio data of the sample layers.

The perceptual model is applied in the frequency domain and directly on the reference and sample audio data respectively.

Furthermore, the frequency domain representation is an internal frequency domain representation of the encoding protocol used to encoder source signal. For example, for an audio encoding using a Fast Fourier Transform (FFT) to convert signals into the frequency domain followed by the encoding of the resulting frequency values, the analysis may be performed in the FFT domain using the generated FFT values directly.

In the specific example, the input encoded audio signal is encoded in accordance with the ITU-T Recommendation G.718 encoding protocol or standard. This standard uses a Modified Discrete Cosine Transform (MDCT) approach for converting the residual signals from layers 2 to 4 into the frequency domain. The resulting frequency coefficients are then entropy encoded to provide audio data for Layers 3-5. In the example, the perceptual model and the analysis accordingly operate in the MDCT domain. Specifically, the reference and sample audio data may comprise the MDCT values of the respective layers. For example, the reference audio data may be made up by the combined MDCT coefficients resulting from the audio data of Layers 1-5 whereas the sample audio data may for example be made up of the coefficients resulting from the audio data of Layer 3 (for an example where the first subset comprises layers 1-3).

The use of a frequency representation that is internal to the encoding system/codec may substantially reduce complexity as it may avoid the need to perform conversions between the frequency domain and the time domain, or the need for conversions between different frequency domain representations. Furthermore, the frequency domain representation, and specifically the MDCT representation, not only facilitates the processing and operations but also provides improved performance.

The perceptual model used in the embodiment of FIGS. 1 and 2 is based on a perceptual model known as P.861 and described in ITU Recommendation P.861(02/98) Objective Quality Measurement of Telephoneband (300-3400 Hz) Speech Codecs.

The P.861 perceptual model has been derived to provide an objective absolute measure of the perceived audio quality for a telephone system. Specifically, the P.861 model has been derived to replace the reliance on subjective Mean Opinion Scores. However, the Inventors have realized that a modified version of this model is also highly advantageous for providing a relative perceptual measure for comparing audio data derived using different sets of enhancement layers. Thus, the Inventors have realized that the P.861 model can be modified to not only to provide facilitated implementation and reduced complexity but also to provide a highly efficient indication of the resulting perceptual significance of discarding layers of encoded audio signals.

Furthermore, the model is modified to work in the MDCT domain thereby obviating the need to fully decode the received audio signal to the time domain. The model has also been significantly simplified to reduce the computational complexity.

The perceptual model will be described in further detail with reference to FIG. 1 which illustrates elements of an example of a method of operation of the apparatus of FIG. 1.

The method initiates in steps 301 and 303 wherein the reference and sample audio data is generated. In the specific example the MDCT coefficients for all layers of the received G.718 signal are generated for the reference audio data, and the MDCT coefficients for the first subset of layers of the received G.718 signal are generated for the sample audio data. Thus, following steps 301 and 303, two MDCT frequency representations of the original source signal are generated where one representation corresponds to the highest achievable audio quality whereas the other corresponds to a typically reduced quality and data rate representation. In the specific example, the first subset includes the core layers (Layers 1 and 2) of the G.718 signal. The core layers are specifically based on a speech model whereas the remaining layers are based on a waveform encoding. Thus, it is likely that in many scenarios, the core layers may be sufficient for representing speech (at least in low noise environments) whereas the higher layers are typically required for music or other types of audio.

Steps 301 and 303 are followed by steps 305 and 307 respectively wherein an energy measure for each of a plurality of critical bands is determined for the reference and sample audio data respectively.

A critical band, which is synonymous with an auditory filter in this context, is a bandpass filter reflecting the perceptual frequency response of the typical human auditory system around a given audio input frequency. The bandwidth of each critical band is related to the apparent masking of a lower energy signal by a higher energy signal at the critical band centre frequency. Specifically, the typical human auditory system may be modeled with a plurality of critical bands having a bandwidth that increases with the center frequency of the critical band such that the perceptual significance of all bands are substantially the same. It will be appreciated that any suitable criterion or approach for defining the critical bands may be used.

For example, the critical bands may be determined as a number of frequency bands each having a bandwidth given as the Equivalent Rectangular Bandwidth (ERB). The ERB represents the relationship between the auditory filter, frequency and the critical bandwidth. An ERB passes the same amount of energy as the auditory filter it corresponds to and shows how it changes with input frequency. The ERB can be calculated using the following equation:

$$\mathrm{ERB}=24.7\log(4.37F+1)$$

where the ERB is in Hz and F is the centre frequency in kHz.

The energy of each critical band for the reference signal (referenced by the index "x") and the sample signal (referenced by the index "y") are specifically found as:

$$Px[j]=\frac{\Delta f_j}{0.321}\cdot\frac{1}{I_u[j]-I_l[j]}\cdot\sum_{I_l}^{I_u}(X_i[j])^2$$

$$Py[j]=\frac{\Delta f_j}{0.321}\cdot\frac{1}{I_u[j]-I_l[j]}\cdot\sum_{I_l}^{I_u}(Y_i[j])^2$$

where $\Delta f$ is the frequency range of the j'th critical band, $I_u$ and $I_l$ are the upper and lower frequencies of the corresponding MDCT bins, and $X_i[j]$ and $Y_i[j]$ are the MDCT coefficients of the reference signal and the sample signal respectively. The critical bands are furthermore a subset of those in P.861, covering 61 MDCT bins and equating to a frequency range of 100 Hz-6.5 kHz. It has been found that this may reduce complexity while still providing sufficient accuracy for assessing the relative perceptual impact of discarding enhancement layers.

Step 305 and 307 are followed by steps 309 and 311 respectively wherein the first indication processor 201 and the second indication processor 205 respectively proceed to apply a loudness compensation to the derived energy measure of each of the critical bands. This results in a perceptual indication for the reference and sample signal which takes into account the frequency distribution and the amplitude level of the received signal. Specifically, perceptual indications are generated that comprise loudness compensated energy measures for each of the critical bands.

In the specific example, the loudness compensation comprises determining a loudness compensated energy measure for a critical band as a function of:

$$\left(a + b\frac{P}{P_R}\right)^{\gamma}$$

where a is a design parameter with a value in the interval [0.25;0.75]; b is a design parameter with a value in the interval [0.25;0.75]; $P_R$ is a reference energy value, P is an energy value for the critical band, and γ is a design parameter with a value in the interval [0.1;0.3]. It has been found that these values provide a particularly advantageous perceptual analysis useful for evaluating whether enhancement layers can be discarded.

As an example, the following loudness weighting can be applied:

$$Lx[j] = \left(0.5 + 0.5 \cdot \frac{Px[j]}{P_0[j]}\right)^{\gamma} - 1$$

$$Ly[j] = \left(0.5 + 0.5 \cdot \frac{Py[j]}{P_0[j]}\right)^{\gamma} - 1$$

where γ=0.2 (determined empirically) and $P_0[j]$ is the internal threshold given by P.861.

The derived perceptual indications (comprising a set of loudness compensated energy measures for critical bands for each of the reference and the sample signal) are then fed to the comparison processor 207 which proceeds to execute step 313 where a difference measure is calculated based on the loudness compensated energy measures.

It will be appreciated that any suitable difference measure may be determined. For example, the loudness compensated energy measures for each critical band could simply be subtracted from each other followed by a summation of the absolute value of the difference and a normalization relative to the total energy.

However, in the specific example, the difference measure is calculated as:

$$D = 1 - \frac{\left(\sum_{j=0}^{60} Lx[j] \cdot Ly[j]\right)^2}{\sum_{j=0}^{60} (Lx[j])^2 \cdot \sum_{j=0}^{60} (Ly[j])^2}$$

(reflecting that there are 61 critical bands in the specific example).

Step 313 is followed by step 315 wherein a time domain low pass filtering is applied to the difference measure. Specifically, the process of generating a difference measure may be repeated for, for example, every 20 msec segment. The resulting values may then be filtered by a rolling average to provide a more reliable indication of the perceptual significance of the enhancement layers excluded from the sample audio data.

Step 315 is followed by step 317 wherein it is estimated whether the (low pass filtered) difference measure exceeds a threshold. If so, the perceptual significance of the enhancement layers is significant and accordingly the output unit 111 proceeds to generate the output signal using all layers (i.e. including the enhancement layers). If not, the perceptual significance of the enhancement layers is not (sufficiently) significant and accordingly the output unit 111 proceeds to generate the output signal using only the layers of the first subset (i.e. using only the core layers).

This provides a highly efficient approach for reducing the data rate of an encoded audio signal. The applied perceptual model/evaluation furthermore has a low complexity thereby reducing the computational resource required. Indeed, the specific exemplary approach utilizes a modified version of the P.861 model that has been optimized for the specific purpose.

The low complexity is furthermore achieved by the perceptual model being applied in the frequency domain representation that is also used for the encoding of the signal (the MDCT representation in the specific example).

It will be appreciated that the approach however does not require this. For example, in some embodiments the reference audio data may be a time domain audio signal which is generated by decoding the audio data of the reference set of layers wherein the sample audio data as a time domain audio signal generated by decoding the audio data of the first subset of layers. A time domain perceptual model may then be applied to evaluate the perceptual significance. As another example, any suitable frequency transform may be applied to the time domain signals (for example a simple FFT) and the approach described with reference to FIG. 3 may be used based on the specific frequency transform.

In the previous example, the apparatus used a fixed configuration wherein the reference audio data corresponded to all layers whereas the first subset comprised Layers 1 and 2. However, in some embodiments the layers used for the reference audio data and/or the sample audio data may be dynamically determined based on a previous perceptual comparison between audio data corresponding to different sets of layers.

For example, a perceptual comparison of audio data corresponding to the full reference signal and audio data corresponding to only Layers 1 and 2 may be performed as previously described. If the resulting difference measure is above the threshold, the impact of discarding the three higher layers is considered too high. The apparatus may then instead of the generating an output signal using all layers, proceed to repeat the process with a different selection of layers for the sample audio data. Specifically, it may include the next enhancement layer in the first subset (such that this includes layers 1-3) and repeat the evaluation. If this results in a difference measure below the threshold, the output signal may be generated using layers 1-3 and otherwise the analysis may be repeated with the first subset including Layers 1-4. If this results in a difference measure below the threshold, only layers 1-4 are included in the output encoded audio signal and otherwise all five layers are included.

In some embodiments, the system may specifically proceed to generate the output audio data to include the audio data from the minimum number of layers that are required to be included in the smaller set of layers (the first subset) in order for the comparison to meet the criterion, i.e. for the difference measure to be sufficiently low. This may for example be achieved by iterating the steps for increasing numbers of layers in the first subset as described in the previous paragraph until this results in the difference measure meeting the criterion. The output data may then be generated to include all audio data from the layers currently included in the first subset.

As another example, the process may start by generating the first subset by removing one layer of the reference set. The resulting difference measure is then calculated. If this meets the criterion, the system then proceeds to remove one more layer from the first subset and to repeat the process. These iterations are continued until the criterion is no longer met and the output data may then be generated to include the audio data from the last subset that did meet the criterion.

Such an approach may for example allow the data rate to automatically reduced to a minimum value that can still support a given required quality level. It will be appreciated that a parallel approach may alternatively (or additionally) be used.

In some embodiments, the reference set of layers is selected in response to a data rate requirement for the output data signal. For example, the received signal may be a 32 kbit/s audio signal which is intended to be forwarded via a communication link that has a maximum capacity of 24 kbit/s. In such a case, the reference set may be selected to only include four layers corresponding to a maximum bit rate of 24 kbit/s. It will be appreciated that the data rate requirement may be a preferred requirement and may for example be determined in response to dynamically determined characteristics or measurements.

For example, depending on the current loading, a target data rate for the output encoded audio signal may be determined. This may then be used to determine how many layers are included in the reference set (and thus the maximum data rate). For example, for a target average data rate of, say, 12 kbit/s, only layers 1-4 may be included in the reference set thereby limiting the maximum data rate to 24 kbit/s and often (depending on the characteristics of the input encoded audio signal) resulting in an average data rate of around 12 kbit/s. However, for an average data rate of, say, 18 kbit/s, the reference set is selected to include all the available layers.

The apparatus may be particularly advantageous when used to dynamically adapt bit rates in a communication system. In particular, for a cellular communication system, the described approach may be used to adapt the required data rate and thus the loading of the system. In particular, it may be advantageous for adapting the downlink air interface resource requirement. Indeed, as the approach relies only on the encoded audio signal itself, and does not require that the original source signal is available, it can be performed by any network entity receiving the encoded audio signal and is not restricted to be performed by the originating network element. This may in particular allow it to be implemented in the network element that controls downlink air interface, such as a base station or radio network controller.

For example, it is envisaged that a codec based on ITU-T G.718 will be used in the Evolved Packet System (EPS) which is being standardized as an evolutionary packet based network for 3GPP ($3^{rd}$ Generation Partnership Project). EPS uses a (semi)persistent scheduling of downlink air interface resource where at least some air interface resource is scheduled for the individual User Equipment (UE) for at least a given duration. This allows data to be communicated to the UE during this interval without requiring a large signaling overhead. The persistent scheduling may typically allocate a fixed resource at the start of a talk spurt with this resource continuing to be allocated to the UE for a given duration or until the UE releases the resource (for example because it detects that a speech spurt has ended). In EPS the persistent scheduling includes the setting up of a semi-persistent resource where a continuous resource is persistently scheduled for speech but not for retransmissions.

In a cellular system, such as EPS, it is desirable to adapt the speech data rate depending on the loading and the available resource. In particular, the available air interface resource is restricted and accordingly it is advantageous to dynamically adapt the data rate depending on the air interface resource usage characteristics.

Furthermore, data rate reductions are advantageous in general. Clearly, it is desirable that the impact of data rate reductions is minimized and therefore it is desirable that data rate reductions are based on the specific requirements and characteristics of the signal being encoded.

It has therefore been proposed in some cellular communication systems that variable bit rate codecs are used. Such codecs are based on an evaluation of the source signal that is to be encoded and a selection of encoding parameters and modes that are particularly suitable for this signal. However, such a variable rate encoding requires access to the source signal and is complex and resource demanding. Therefore, it is impractical to use for a large number of links. Also, it is not appropriate for adapting the downlink air interface resource as only the encoded signal itself tends to be available at the downlink side.

Figure 3:
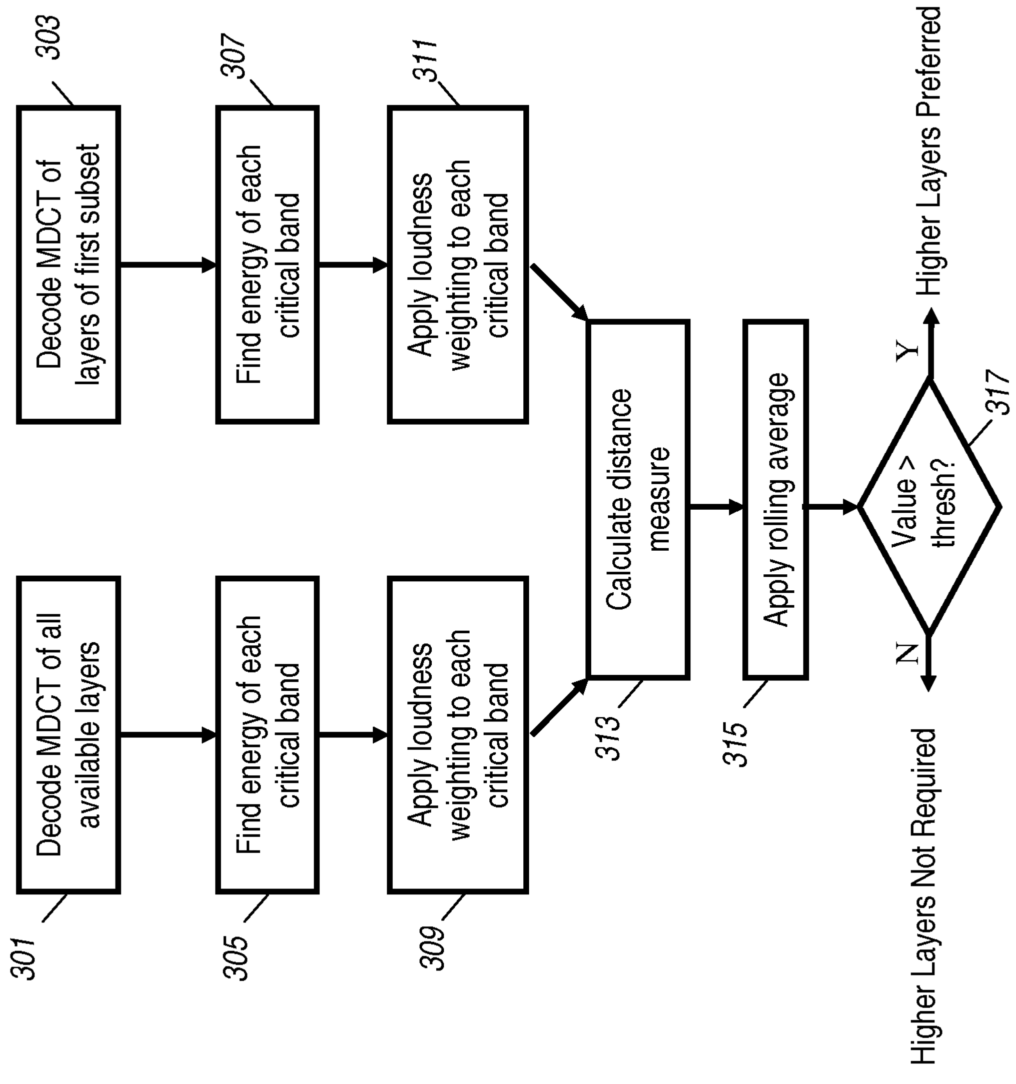
FIG. 3 illustrates an example of a method for generating an output audio data signal.

However, the approach of FIGS. 1-3 is highly advantageous for adapting and reducing the data rate at the downlink side as it requires only the encoded signal itself. Accordingly, it may be used to reduce the data rate over the downlink air interface thereby resulting in improved performance and increased capacity of the cellular communication system as a whole.

Figure 4:
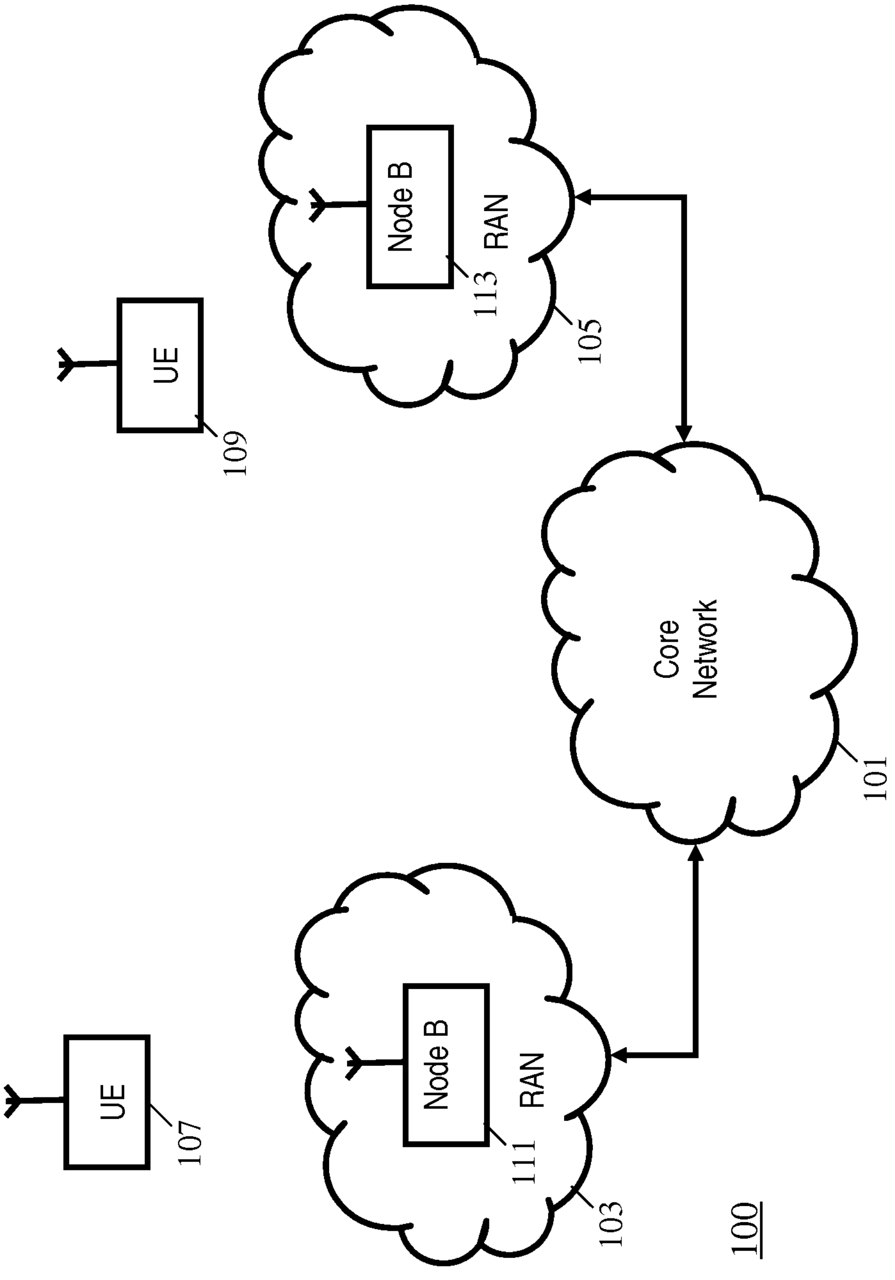
FIG. 4 illustrates an example of a cellular communication system comprising an apparatus for generating an output audio data signal.

FIG. 4 illustrates an example of a cellular communication system comprising an apparatus of FIG. 1. The cellular communication system may for example be an EPS based system or a UMTS (Universal Mobile Telecommunication System) system.

The cellular communication system includes a core network 401 which in the example is illustrated to be coupled to two Radio Access Networks (RANs) 403, 405 which in the specific case are UMTS Terrestrial Radio Access Networks (UTRANs).

FIG. 4 illustrates an example wherein a communication is set up between a first UE 407 and a second UE 409. The communication carries audio data encoded at the UEs 407, 409 based on an ITU-T G.718 encoder. The first UE 407 accesses the system via a first base station (Node B) 411 of the first RAN 403 and the second UE 409 accesses the system via a second base station 413 of the second RAN 405.

In the example, the base stations 411, 413 furthermore control the air interface resource for the two UEs 407, 409 respectively. Thus the first base station 411 performs air interface resource scheduling for the first UE 407. This scheduling may include the allocation of persistent and semi-persistent resource elements to the first UE 407 on both the uplink and the downlink. The first base station 411 furthermore comprises an apparatus as described with reference to FIGS. 1-3.

In the example, the first base station 411 may receive an ITU-T G.718 encoded audio signal from the second UE 409 intended for the first UE 407. The first base station 411 may then proceed to first evaluate a current loading of the first base station 411. If this is below a given threshold (i.e. the first base station 411 is lightly loaded), sufficient air interface is scheduled for the first base station 411 to communicate the received G.718 data to the first UE 407. However, if the loading is above the threshold, the first base station 411 proceeds to evaluate the received G.718 encoding data in order to potentially reduce the data rate. Thus, the first base station 411 proceeds to perform the approach previously described in order to generate an output encoded audio signal that potentially has fewer layers than the received data. Thus, the first base station 411 proceeds to discard enhancement layers unless this results in an unacceptable perceived quality degradation.

The resulting data rate of the output encoded audio signal is furthermore fed to the scheduling algorithm which proceeds to allocate the required resource for this data rate. Thus, if a reduced data rate can be achieved by discarding one or more enhancement layers, the downlink air interface resource that is allocated to the first UE 407 is reduced. Specifically, a persistent or semi-persistent scheduling of resource may be performed for the first UE 407 when a talk spurt is detected. Furthermore, this (semi) persistent resource is only sufficient to accommodate the reduced data rate G.718 signal.

Thus, the approach may allow a much more efficient air interface resource utilization, and in particular downlink air interface utilization. Furthermore, this can be achieved with low complexity and low computational and communication resource requirements as the resource scheduling and data rate reduction/determination can be located in the same RAN, and specifically in the same network element of the RAN. Thus, improved performance and capacity of the cellular communication system as a whole can be achieved while maintaining low complexity, resource usage and perceived quality degradation.

Figure 5:
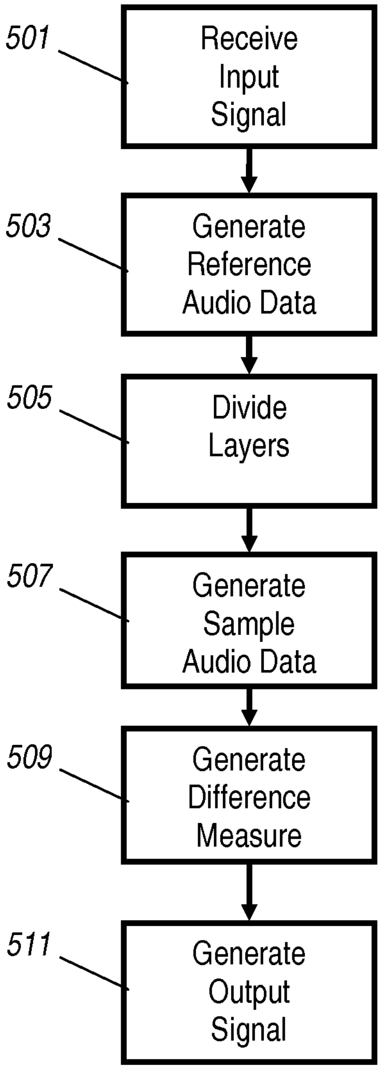
FIG. 5 illustrates an example of a method for generating an output audio data signal.

FIG. 5 illustrates an example of a method for generating an output audio data signal.

The method initiates in step 501 wherein an input encoded audio data signal comprising a plurality of encoding layers including a base layer and at least one enhancement layer is received.

Step 501 is followed by step 503 wherein reference audio data corresponding to audio data of a reference set of layers of the plurality of layers is generated.

Step 503 is followed by step 505 wherein the plurality of layers is divided into a first subset and a second subset with the first subset comprising the base layer.

Step 505 is followed by step 507 wherein sample audio data corresponding to audio data of layers of the first subset is generated.

Step 507 is followed by step 509 wherein a difference measure is generated by comparing the sample audio data to the reference audio data based on a perceptual model.

Step 509 is followed by step 511 wherein it is determined if the difference measure meets a similarity criterion and if so, the output audio data signal is generated to not include audio data from at least one layer of the second subset; and otherwise, the output audio data signal is generated to include audio data from the at least one layer of the second subset.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by for example a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. An apparatus for generating an output audio data signal, the apparatus comprising:

a receiving device for receiving an input encoded audio data signal comprising a plurality of encoding layers including a base layer and a plurality of enhancement layers;

a reference unit for generating reference audio data from a reference set of layers of the plurality of encoding layers;

a sampling device for generating sample audio data from a set of layers smaller than the reference set of layers;

a comparison processor for comparing the sample audio data to the reference audio data, the comparison reflecting a difference between a first decoded signal corresponding to the sample audio data and a second decoded signal corresponding to the reference audio data;

an output device for determining whether the comparison meets a criterion and if so, generating the output audio data signal to not include audio data from a first layer, the first layer being a layer of the reference set not included in the smaller set of layers;

and otherwise, generating the output audio data signal to include audio data from the first wherein the comparison is based on a perceptual model, wherein the comparison processor is configured to:

generate a first perceptual indication by applying the perceptual model to the reference audio data; and generate a second perceptual indication by applying the perceptual model to the sample audio data; and the output device is arranged to determine whether the comparison meets the criterion in response to a comparison of the first perceptual indication and the second perceptual indication, wherein the perceptual model is configured to:

determine an energy measure for each of a plurality of critical bands;

apply a loudness compensation to the energy measure of each of the plurality of critical bands to generate a perceptual indication comprising loudness compensated energy measures for each of the critical bands; and the output device is further arranged to determine whether the comparison meets the criterion in response to a comparison of the loudness compensated energy measures for each of the critical bands for the reference audio data and the sample audio data.

2. The apparatus of claim 1 wherein the reference audio data corresponds to a frequency domain representation of an audio signal represented by the audio data of layers of the reference set, and the sample audio data corresponds to a frequency domain representation of an audio signal represented by the audio data of layers of the smaller set of layers.

3. The apparatus of claim 2 wherein the frequency domain representation is an internal frequency domain representation of an encoding protocol of the input encoded audio data signal.

4. The apparatus of claim 1 arranged to generate the output audio data from a minimum number of layers required in the smaller set of layers for the comparison to meet the criterion.

5. The apparatus of claim 1 wherein the loudness compensation comprises determining a loudness compensated energy measure for a critical band as a function of:

$$\left(a + b\frac{P}{P_R}\right)^{\gamma}$$

where a is a design parameter with a value in the interval [0.25;0.75]; b is a design parameter with a value in the interval [0.25;0.75]; $P_R$ is a reference energy value, P is an energy value for the critical band, and $\gamma$ is a design parameter with a value in the interval [0.1;0.3].

6. The apparatus of claim 1 wherein:

the reference unit is arranged to generate the reference audio data as a time domain audio signal by decoding the audio data of the reference set of layers; and the reference unit is arranged to generate the sample audio data as a time domain audio signal by decoding the audio data of the first subset of layers.

7. The apparatus of claim 1 wherein output device is arranged to generate the output audio data signal to include audio data from all layers of the plurality of encoding layers if the comparison does not meet the criterion.

8. The apparatus of claim 1 wherein the base layer comprises parametrically encoded speech data based on a speech model, and at least one layer of the reference set of layers not included in the smaller set of layers comprises waveform encoded audio data.

9. The apparatus of claim 1 wherein input encoded audio data signal is encoded in accordance with an International Telecommunication Union Telecommunication Standardization Sector, ITU-T, G.718 protocol.

10. A communication system including a network entity which comprises:

a receiving device for receiving an input encoded audio data signal comprising a plurality of encoding layers including a base layer and a plurality of enhancement layers;

a reference unit for generating reference audio data from a reference set of layers of the plurality of encoding layers;

a sampling device for generating sample audio data from a set of layers smaller than the reference set of layers;

a comparison processor for comparing the sample audio data itself to the reference audio data itself, the comparison reflecting a difference between a first decoded signal corresponding to the sample audio data and a second decoded signal corresponding to the reference audio data;

an output device for determining whether the comparison meets a criterion and if so, generating the output audio data signal to not include audio data from a first layer, the first layer being a layer of the reference set not included in the smaller set of layers;

and otherwise, generating the output audio data signal to include audio data from the first layer, wherein the comparison is based on a perceptual model, wherein the comparison processor is configured to:

generate a first perceptual indication by applying the perceptual model to the reference audio data;

generate a second perceptual indication by applying the perceptual model to the sample audio data; and the output device is arranged to determine whether the comparison meets the criterion in response to a comparison of the first perceptual indication and the second perceptual indication, wherein the perceptual model is configured to:

determine an energy measure for each of a plurality of critical bands;

apply a loudness compensation to the energy measure of each of the plurality of critical bands to generate a perceptual indication comprising loudness compensated energy measures for each of the critical bands; and the output device is further arranged to determine whether the comparison meets the criterion in response to a comparison of the loudness compensated energy measures for each of the critical bands for the reference audio data and the sample audio data.

11. The communication system of claim 10 wherein the network entity is a Radio Access Network network element of a cellular communication system.

12. The communication system of claim 11 further comprising an allocating unit for allocating an air interface resource in response to a set of layers included in the output audio data signal.

13. A method for generating an output audio data signal, the method comprising:

receiving an input encoded audio data signal comprising a plurality of encoding layers including a base layer and a plurality of enhancement layers;

generating reference audio data from a reference set of layers of the plurality of encoding layers;

generating sample audio data from a set of layers smaller than the reference set of layers;

comparing the sample audio data itself to the reference audio data itself, the comparison reflecting a difference between a first decoded signal corresponding to the sample audio data and a second decoded signal corresponding to the reference audio data;

determining whether the comparison meets a criterion and if so, generating the output audio data signal to not include audio data from a first layer, the first layer being a layer of the reference set not included in the smaller set of layers;

and otherwise, generating the output audio data signal to include audio data from the first layer, wherein the comparison is based on a perceptual model, wherein the comparison step further comprises:

generating a first perceptual indication by applying the perceptual model to the reference audio data;

generating a second perceptual indication by applying the perceptual model to the sample audio data;

the method further comprising determining whether the comparison meets the criterion in response to a comparison of the first perceptual indication and the second perceptual indication, wherein the perceptual model is configured to:

determine an energy measure for each of a plurality of critical bands; and apply a loudness compensation to the energy measure of each of the plurality of critical bands to generate a perceptual indication comprising loudness compensated energy measures for each of the critical bands; and the method further comprises determining whether the comparison meets the criterion in response to a comparison of the loudness compensated energy measures for each of the critical bands for the reference audio data and the sample audio data.

* * * * *